United States Patent
Cartwright et al.

(10) Patent No.: US 7,575,624 B2
(45) Date of Patent: Aug. 18, 2009

(54) MOLECULAR SIEVE AND MEMBRANE SYSTEM TO PURIFY NATURAL GAS

(75) Inventors: Gordon T. Cartwright, Tyler, TX (US); Keith R. Clark, Houston, TX (US)

(73) Assignee: UOP PLLC, Des Plaines, IL (US)

(*) Notice: Subject to any disclaimer, the term of this patent is extended or adjusted under 35 U.S.C. 154(b) by 386 days.

(21) Appl. No.: 11/613,055

(22) Filed: Dec. 19, 2006

(65) Prior Publication Data

US 2008/0141714 A1 Jun. 19, 2008

(51) Int. Cl.
*B01D 53/02* (2006.01)
*B01D 61/00* (2006.01)

(52) U.S. Cl. .............. 95/51; 95/139; 96/4; 96/122; 96/130; 96/144

(58) Field of Classification Search .......... 96/4–14, 96/121, 122, 126–128, 130, 134, 143, 144, 96/146; 95/51, 115, 139, 148; 423/230; 585/820

See application file for complete search history.

(56) References Cited

U.S. PATENT DOCUMENTS

| | | | |
|---|---|---|---|
| 4,130,403 A | 12/1978 | Cooley et al. ............ 55/16 |
| 4,229,188 A | 10/1980 | Intille ...................... 55/16 |
| 4,230,463 A | 10/1980 | Henis et al. .............. 55/16 |
| 4,238,204 A | 12/1980 | Perry ....................... 55/16 |
| 4,398,926 A | 8/1983 | Doshi ...................... 55/16 |
| 4,701,187 A | 10/1987 | Choe et al. ............... 55/16 |
| 4,783,203 A * | 11/1988 | Doshi ...................... 95/50 |
| 4,863,492 A | 9/1989 | Doshi et al. .............. 55/16 |
| 5,435,836 A * | 7/1995 | Anand et al. ............. 95/45 |
| 5,753,010 A * | 5/1998 | Sircar et al. .............. 95/45 |
| 2004/0123737 A1* | 7/2004 | Filippi et al. ............. 95/139 |

* cited by examiner

*Primary Examiner*—Frank M Lawrence
(74) *Attorney, Agent, or Firm*—Mark Goldberg

(57) ABSTRACT

The invention comprises a process of removing carbon dioxide from a natural gas feed stream comprising sending a natural gas feed stream comprising methane and carbon dioxide through an adsorbent bed to produce a carbon dioxide depleted methane rich product stream after removal of carbon dioxide. The adsorbent bed is regenerated and then the spent regeneration gas stream cooled to produce a cooled spent regeneration gas stream that is sent to a membrane element. A permeate stream passes through the membrane element and a residue stream passes by the membrane element without passing through said membrane element. Substantially all of the carbon dioxide and a minor portion of the methane comprises the permeate stream which is disposed of and a major portion of the methane and a minor portion of the carbon dioxide comprises the residue stream which is then recirculated to the regeneration gas stream.

19 Claims, 2 Drawing Sheets

MOLECULAR SIEVE AND MEMBRANE SYSTEM TO PURIFY NATURAL GAS

FIELD OF THE INVENTION

The present invention relates to a process and a system for significantly reducing the carbon dioxide content in natural gas. More particularly, the invention relates to a system comprising both membrane and molecular sieve bed components that provide the desired reduction in carbon dioxide while minimizing loss of natural gas product.

BACKGROUND OF THE INVENTION

Carbon dioxide, which falls into the category of acid gases is commonly found in natural gas steams at levels as high as 80%. In combination with water, it is highly corrosive and rapidly destroys pipelines and equipment unless it is partially removed or exotic and expensive construction materials are used. Carbon dioxide also reduces the heating value of a natural gas stream and wastes pipeline capacity. In liquid natural gas (LNG) plants, carbon dioxide must be removed to prevent freezing in the low temperature chillers. The treatment of natural gas for the removal of carbon dioxide typically requires the processing of large volumes of gas to produce a treated gas product with about 1 to 4 mol-% carbon dioxide. The carbon dioxide is removed from natural gas for reasons such as improving the heating value of the treated gas for pipeline transmission and, recovering the carbon dioxide from gases associated with oil field $CO_2$ injection for enhanced oil production.

In some applications it is necessary to purify the natural gas to a much greater extent. In particular, in circumstances when pipelines are not available, natural gas can be shipped from distant sources in the form of liquefied natural gas (LNG). Since LNG occupies only a fraction (1/600) of the volume of natural gas, and takes up less space, it is more economical to transport across large distances and can be stored in larger quantities. Liquefied natural gas, or LNG, is natural gas in its liquid form. When natural gas is cooled to minus 161° C. (−259° F.), it becomes a clear, colorless, odorless liquid. LNG is neither corrosive nor toxic. Natural gas is primarily methane, with relatively low concentrations of other hydrocarbons, water, carbon dioxide, nitrogen, oxygen and some sulfur compounds. It is necessary to remove many of these impurities prior to the process of producing the LNG. During the process known as liquefaction, natural gas is cooled below its boiling point and most of these impurities are removed. The remaining natural gas product after liquefaction is primarily methane with only small amounts of other hydrocarbons present. LNG weighs less than half the weight of water so it will float if spilled on water.

"Natural gas" is a general term which is applied to mixtures of inert gases and light hydrocarbon components which are derived from natural gas wells or from gas associated with the production of oil. Typically, the quality of the natural gas, as produced, will vary according to the content and amount of inert gases and other impurities in the natural gas. These inert gases such as nitrogen, carbon dioxide, and helium will reduce the heating value of the natural gas. Because untreated natural gas is usually saturated with water, the presence of carbon dioxide in significant amounts may make the natural gas corrosive. Natural gas is usually conveyed from its source to the consumer in pipelines. As a result, very rigid guidelines have been established by the gas transmission industry to maintain a high quality, safe product. Typical specification for pipeline quality natural gas include: Nitrogen less than 4 mol-%, and carbon dioxide less than 4 mol-%. However, at a 4 mol-% level, there would still be 40,000 parts per million (ppm) carbon dioxide. While this level is considered acceptable for pipeline transport of natural gas, in the production of LNG, the goal is to reduce the level of carbon dioxide by about a factor of 1000 to below 50 ppm.

The most important aspect of any process for treating natural gas is economics. The most critical characteristics of a $CO_2$ removal process are the energy requirements and the concentration level to which $CO_2$ can be lowered in the exit gas. Natural gas is treated in very high volumes making even slight differences of 1-2% in the capital or operating cost of the treatment units very significant factors in the selection of process technology. Furthermore, because natural gas is a potentially dangerous and explosive fuel, especially in the large volumes present at a treatment plant, processes are sought which have high reliability, simplicity and safety.

Liquid absorption systems are commonly used for the removal of carbon dioxide from natural gas. A physical solvent such as a dimethylether of polyethylene glycol or chemical solvents such as alkanolamines or alkali metal salts may be used to wash out carbon dioxide. The carbon dioxide rich solvent is subsequently regenerated by stripping of the carbon dioxide with heat. These liquid adsorption systems typically achieve about 200 ppmv carbon dioxide levels. When lower levels are desired, they can be supplemented with a molecular sieve adsorbent bed to lower the carbon dioxide level below 50 ppmv. These liquid absorption systems are effective, but they are expensive and it is desirable to develop more cost efficient systems for purification of natural gas.

Membranes such as those disclosed in U.S. Pat. No. 4,230,463 to Henis et al. are effective for separating at least one gas component from a gaseous mixture by permeation where the membranes have a coating in occluding contact with a porous separation membrane. Membranes may be used in a single stage or integrated in multiple stages to preferentially separate the more permeable component. However, the membranes will pass a portion of the less permeable gases along with the preferentially separated gas thereby limiting recovery of the non-permeable gases and producing a low quality permeate reject stream. As a result of this limitation, single stages of membranes are often combined with additional membrane stages and the permeate is recycled with the feed to the first stage to improve the separation and reduce losses. However, the use of additional membrane stages combined with the added recompression costs to recompress the permeate stream and recycle it to the first membrane stage are significant as membranes do not provide any economy of scale with increases in gas capacity for the same separation. The cost of membrane technology is directly proportional to the area of the membrane employed. U.S. Pat. No. 4,130,403 to Cooley et al. is an example of the use of multiple stages of membrane separation to obtain a carbon dioxide-rich permeating gas. Membrane systems have been found effective for gas pipeline applications, but they do not lower the carbon dioxide level to the extent needed for LPG applications. Typically they lower the level of carbon dioxide to about 20,000 ppmv, while the desired level of carbon dioxide for LPG is below 50 ppmv.

Alternatively carbon dioxide can be rejected from a multiple component gas stream comprising methane and carbon dioxide in a pressure swing adsorption (PSA) system by recovering high purity methane product and rejecting the tail gas comprising carbon dioxide. However, the PSA process doesn't operate efficiently at the pressures at which the natural gas is available, requiring that all of the gas feed to the PSA unit be reduced to a lower adsorption pressure and all of the treated gas to be recompressed to the product gas pressure. Unfortunately, large amounts of regeneration gas are required to properly regenerate the adsorbent beds. The loss of the regeneration gas from the system is what makes a PSA system inefficient for this application.

U.S. Pat. No. 4,229,188 discloses a process which combines a PSA and a membrane system to produce a high purity product essentially of a single gas. High purity hydrogen is recovered from a feed gas mixture containing hydrogen by passing the feed gas mixture to a selective adsorption unit to initially separate the hydrogen gas. The low pressure tail gas from the PSA is further treated by a membrane system to recover additional quantity of hydrogen. Alternatively, and as taught in U.S. Pat. No. 4,398,926 and U.S. Pat. No. 4,701,187, the feed gas mixture may initially be separated in a membrane separation unit to provide bulk separation of hydrogen. The separated hydrogen may then be passed to a PSA unit to achieve high purity hydrogen gas at high recovery. In U.S. Pat. No. 4,701,187, the tail gas purge stream from the PSA adsorption unit is compressed and recycled with the feed gas mixture to the membrane unit to form an efficient system.

In U.S. Pat. No. 4,863,492 a gas permeable membrane is combined with a PSA unit to produce a mixed gas product having a preset, adjustably-controlled gas ratio and a high purity second gas component. The permeate stream from the gas permeable membrane is fed to the PSA unit and the tail gas from the PSA unit is compressed and blended with the non-permeate steam to form the mixed gas product.

Membranes have been combined with PSA units to improve the recovery of light components. For example, U.S. Pat. No. 4,238,204 to Perry relates to a selective adsorption process for the recovery of a light gas, especially hydrogen, from a feed gas mixture by using a membrane permeator unit selectively permeable to the light gas to recover a more concentrated light gas in a stream comprising the light gas. The light gas is used to regenerate a selective adsorber unit. The more concentrated light gas is utilized in the selective adsorber unit, either blended with the feed gas mixture, or as a purging gas to improve the recovery of the highly purified light gas product.

U.S. Pat. No. 4,398,926 to Doshi relates to a process for recovery of hydrogen from a gas stream containing hydrogen and impurities. The process achieves the bulk separation of hydrogen from the gas stream in a membrane unit and then separates the hydrogen from the impurities in a PSA unit to produce a purified hydrogen product and a waste gas stream. A high pressure gas stream having a hydrogen content of up to 90 mol-% is passed to a permeable membrane capable of selectively permeating hydrogen. The separated hydrogen is recovered at reduced pressure and passed to a PSA unit adapted for operation at the reduced pressure. The non-permeate comprising hydrogen from the permeable membrane is recovered essentially at the higher pressure of the gas stream. A portion of the non-permeate is throttled to a lower pressure with appropriate power recovery and is passed to the PSA unit as a co-feed gas. The co-feed gas contributes to the recovery of the purified hydrogen product and a reduction in the operating costs for the desired hydrogen separation and purification.

Membrane and pressure swing adsorption (PSA) processes are safe and simple systems to operate. As dry systems, membrane and PSA processes, are less susceptible to corrosion and other operating problems associated with wet, amine based carbon dioxide removal systems. However, multistage membrane systems require large amounts of compression for efficient operation, which can represent large capital and energy costs. On the other hand, PSA systems are relatively inefficient at high pressures typically encountered in natural gas treating processes.

SUMMARY OF THE INVENTION

Contaminated feed gas is passed through a molecular sieve system to reduce contaminant level to a level desired for cryogenic applications. The molecular sieve system operates with at least one adsorbent bed in adsorption mode, at least one adsorbent bed in heating (regeneration/desorption) mode and at least one adsorbent bed in cooling mode. When the beds in adsorption mode become saturated with contaminants, they are taken off line from the contaminated feed gas and regenerated. Regeneration is accomplished by passing regeneration loop gases through a heater and then subsequently passing these hot gases through the adsorbent bed being heated at a specified rate. After the spent regeneration gas leaves the adsorbent bed, it is cooled to a specified temperature and then passed through a membrane element (membrane system). In some cases, it may be necessary to add a phase separating vessel, such as a condenser, after the cooler to remove any condensed liquids. A significant portion of the contaminants and some carrier gases pass through the membrane element into a permeate stream. The permeate stream is discarded as required or sent to be burned or flared. The residue gas passes out of the membrane, without going through the membrane, and retains the majority of the carrier gas and a considerably lower level of contaminants. The residue gas is then sent through a blower to boost the pressure and then: a) during the early stages of the heating step, the residue gas bypasses the adsorbent bed that is in cooling mode; b) during the later stages of the heating step, the residue gas is passed through the adsorbent bed that is in cooling mode. The residue gas is then sent to the inlet of the heater and the process begins again. As the regeneration gas passes through the membrane, both contaminants and a small amount of carrier gas is lost to the permeate stream. To replace this loss, feed gas or product gas from the molecular sieve unit may be introduced into the regeneration loop as required to maintain the proper flow rates and operating pressure. Normally the makeup gas would be introduced into the loop just upstream of the recycle blower.

In the present invention, contaminated feed gas is passed through a molecular sieve system to remove contaminants. The molecular sieve system always operates with one adsorbent bed in adsorption mode, one adsorbent bed in heating (desorption) mode, also known as regeneration mode and one adsorbent bed in cooling mode to return the adsorbent bed to a temperature appropriate for adsorption of contaminants. When the adsorbent bed that is in adsorption mode becomes saturated with contaminants, it is taken off line and regenerated. Regeneration is accomplished by passing regeneration gases through a heater and then subsequently passing these hot gases through the adsorbent bed that is being heated at a specified rate. After the spent regeneration gas leaves the adsorbent bed, it is cooled to a specified temperature, by passage of a cooled gas through the adsorbent bed and then passed through a membrane element. In some cases it may be necessary to add a phase separating vessel after the cooler to remove any condensed liquids. A significant portion of the contaminants and some carrier gases pass through the membrane element into the permeate stream. The permeate stream is discarded as required or sent to flare. The residue gas passes out of the membrane, without going through the membrane, and retains the majority of the carrier gas and fewer contaminants. The residue gas is then sent through a blower to boost the pressure and then: a) during the early stages of the heating step, the residue gas bypasses the adsorbent bed in cooling mode; b) during the later stages of the heating step, the residue gas is passed through the adsorbent bed in cooling mode. The residue gas is then sent to the inlet of the heater and the process begins again. As the regeneration gas passes through the membrane, both contaminants and a small amount of carrier gas is lost to the permeate stream. To replace this loss of gas volume, either a portion of the feed gas, or the product gas from the molecular sieve unit may be introduced into the regeneration loop as required to maintain the proper flow rates and operating pressure. In some embodiments of the invention, this makeup gas is introduced into the loop just upstream of the recycle blower.

DETAILED DESCRIPTION OF THE INVENTION

The present invention provides an effective, cost efficient method of purifying a natural gas stream to the extent necessary for cryogenic applications. Natural gas is usually first dried by passage through a molecular sieve bed containing an adsorbent effective in dehydration of natural gas such as zeolite 4A. The water content is reduced to below 0.1 ppmv. In most applications, these adsorbent beds are regenerated by heating with either product gas followed by recycling the spent regeneration gas back to the feed or residue gas, in which case the spent regeneration gas may be vented or flared off. The dried effluent natural gas stream is passed to a molecular sieve system for carbon dioxide removal. In most embodiments of the present invention, the molecular bed system comprises at least three adsorbent beds containing a molecular sieve that is effective for removal of carbon dioxide.

The adsorbent bed continues to remove carbon dioxide from a natural gas stream until the adsorption bed reaches its design saturation level. At this point, the bed is taken off line from the natural gas stream and the adsorbent is regenerated. Regeneration consists of two distinct steps, heating and cooling. Depending upon the specific design of the individual system, heating and cooling can occur as sequential steps in the same bed or as a simultaneous operation in two beds. In those embodiments when heating and cooling takes place sequentially in the same bed, the normal process flow pattern will be to adsorb in one direction downstream while the regeneration and cooling flows travel in the opposite direction, upstream. When there is simultaneous heating and cooling in separate beds, the normal process flow pattern will be adsorption downstream, regeneration flow upstream and the cooling flow downstream.

Figure 1:
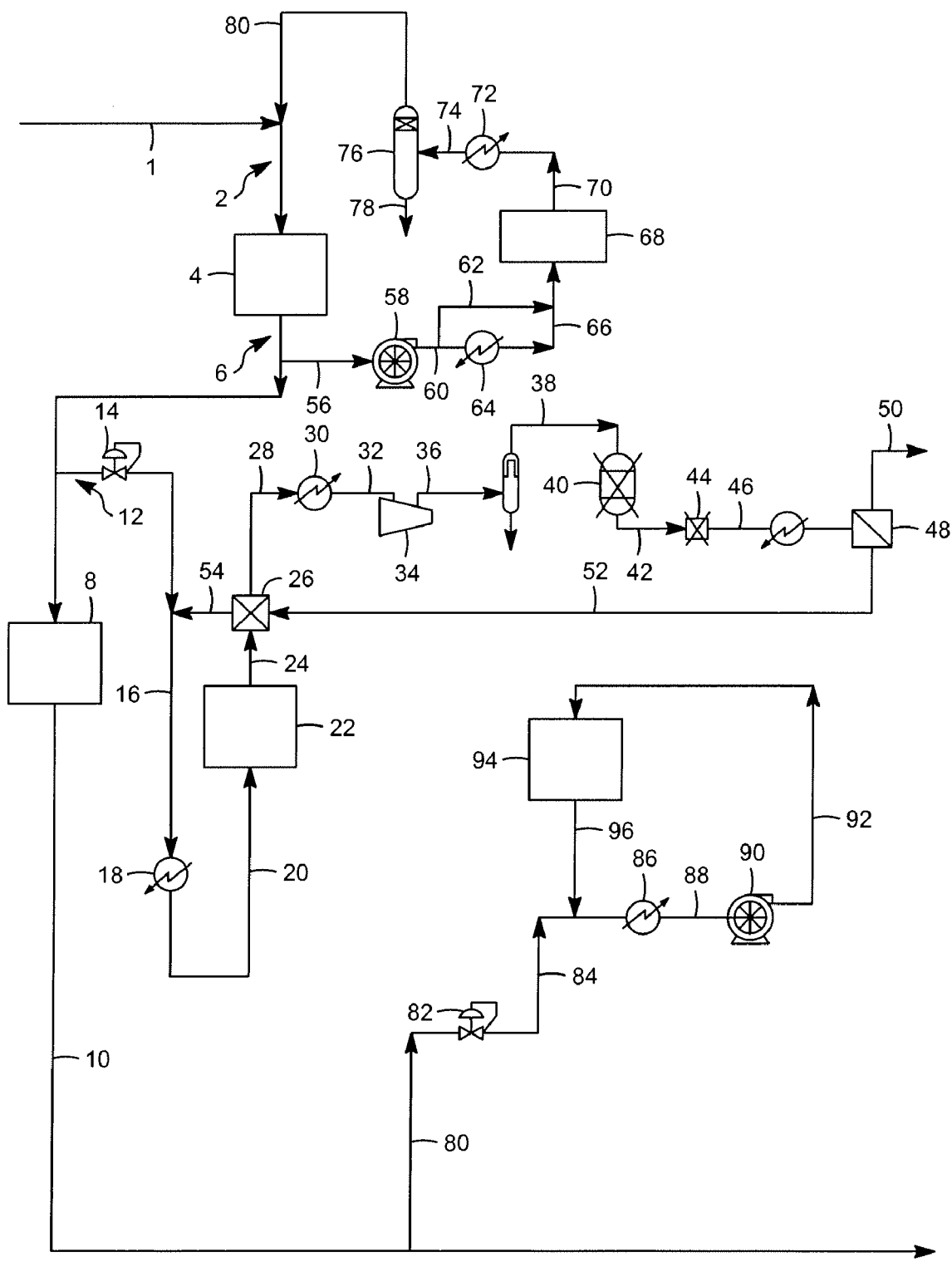
FIG. 1 shows a combination molecular sieve/membrane system with a closed loop regeneration section for removal of carbon dioxide and other impurities from natural gas.
Figure 2:
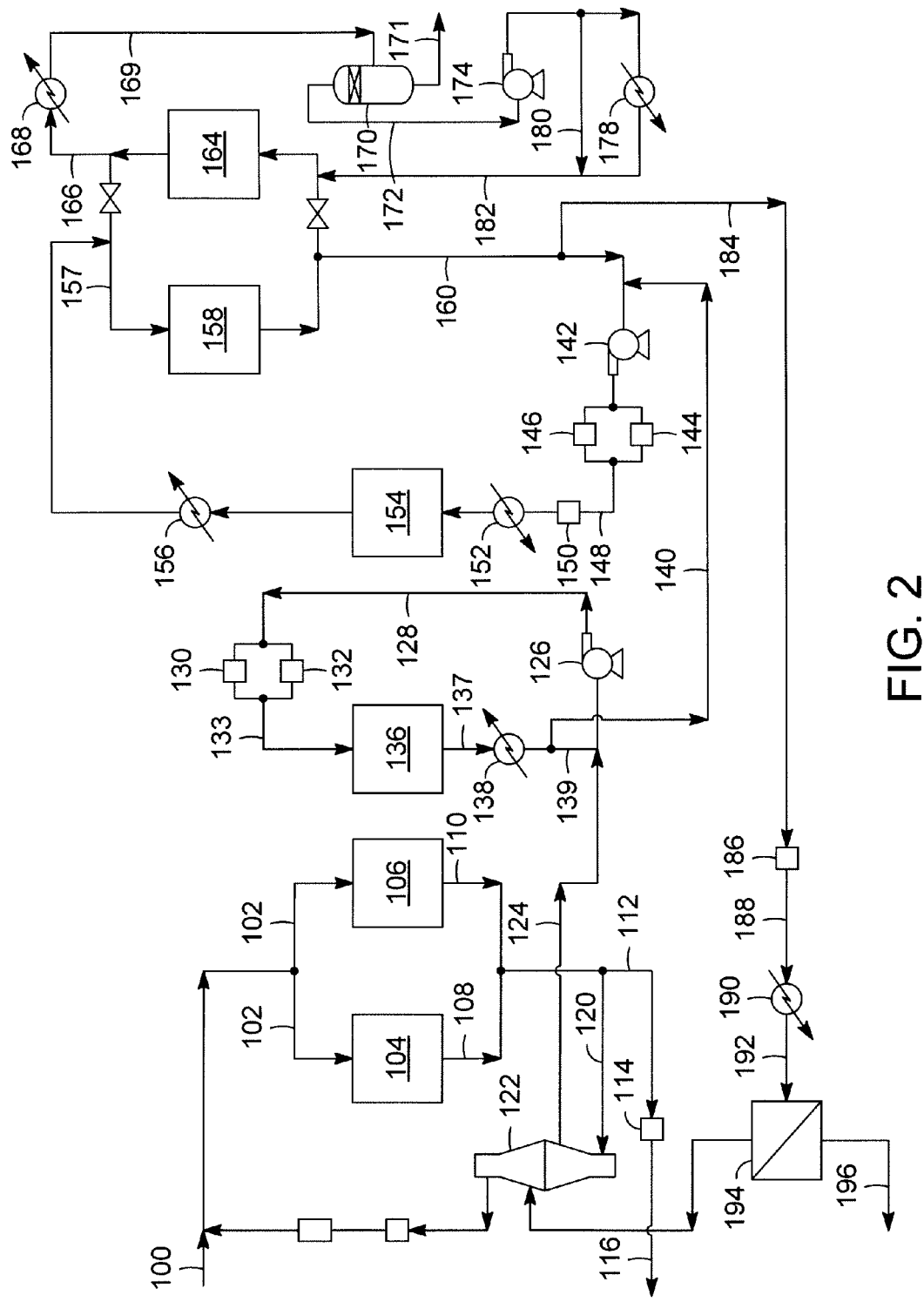
FIG. 2 shows a modification of a combination molecular sieve/membrane system with a closed loop regeneration section for removal of carbon dioxide and other impurities from natural gas.

Contaminated feed gas is passed through a molecular sieve system to remove contaminants. In one embodiment of the invention, the system always operates with one adsorbent bed in adsorption mode, one adsorbent bed in a regeneration or desorption mode in which a heated gas is passed through the adsorbent bed and one adsorbent bed is in cooling mode. There can be more than the three adsorbents present in a system. When the adsorbent bed that is in adsorption mode becomes saturated with impurities, it is taken offline from the incoming contaminated feed gas and regenerated. Regeneration is accomplished by passing regeneration gases through a heater and then subsequently passing the resulting hot regeneration gases through the adsorbent bed. It is preferred to heat the adsorbent bed at a specified rate. After the spent regeneration gas leaves the adsorbent bed, it is cooled to a specified temperature and then passed through a membrane element in the membrane system. If necessary, there is a phase separating vessel after the cooler to remove any condensed liquids. A significant portion of the contaminants and some carrier gases pass through the membrane element into the permeate or waste stream to be discarded or flared off. The residue gas passes out of the membrane without going through the membrane itself and retains the majority of the carrier gas and a lower concentration of contaminants than the permeate stream. This residue gas is then sent through a blower to boost the pressure and then during the early stages of the heating step, this residue gas bypasses the adsorber that is in cooling mode after being regenerated but then during the later stages of the heating step, the residue gas is cooled as necessary and passed through the adsorber in cooling mode. The residue gas is then sent to a heater and the process begins again. As the regeneration gas passes through the membrane, both contaminants and a small portion of the carrier gas is lost to the permeate stream. To replace this loss, makeup gas that is either feed gas to or product gas from the molecular sieve unit may be introduced into the regeneration loop of the system in order to maintain the proper flow rates and operating pressures. Normally this makeup gas would be introduced into the loop just upstream of the recycle blower. In some embodiments of the invention, there may be separate loops of heating and cooling regeneration gases. FIGS. 1 and 2 illustrate both types of systems.

The heating loop section of the system passes the regeneration gas through a heater, the heating adsorber, a cross-flow heat exchanger, a cooler, a compressor, a filter coalescer, a carbon guard bed, a particle filter and a membrane separator to separate the gas flow into two gas streams, one stream that has a high level of carbon dioxide and a second stream that has a low level of carbon dioxide. The stream that has a low level of carbon dioxide, also referred to herein as the residue stream, is mixed with the on line adsorber's natural gas feed or the effluent stream, which is used to stabilize the inlet pressure to the heater. The combined stream is then sent back through the cross-flow heat exchanger prior to being returned to the heater. The stream with a high level of carbon dioxide is sent to vent or flare.

At the end of the adsorption cycle, prior to the start of the regeneration cycle, the carbon dioxide is trapped within the molecular sieve. Heating during the regeneration cycle slowly releases the carbon dioxide from the molecular sieve. System pressures increase as heat and carbon dioxide levels increase. Carbon dioxide levels are bled down by the membrane with increasing efficiency as the carbon dioxide partial pressure builds.

In those embodiments where the cooling step is done sequentially in the same vessel, the heater is bypassed originally and the flow passes through the offline adsorber, a cooler, a compressor, a filter coalescer, a carbon guard bed and a particle filter. The membrane unit would be bypassed as continued carbon dioxide removal is unnecessary and excess hydrocarbon loss is thereby prevented. If the cooling step is done simultaneously in a second vessel, flow is passed through the cooling adsorber, a cooler, a compressor, a filter coalescer, a carbon guard bed and a particle filter and returned to the adsorber. A controlled bleed from the online adsorber's effluent stream is used to stabilize the cooling loop pressure into the compressor.

The membrane materials used for $CO_2$ removal are polymer based, for example, cellulose acetate, polyimides, polyamides, polysulfone, polycarbonates, and polyetherimide. The most widely used and tested material is cellulose acetate. Polyimide has some potential in certain $CO_2$ removal applications, but it has not received sufficient testing to be used in large applications. The properties of polyimides and other polymers can be modified to enhance performance. For example, polyimide membranes were initially used for hydrogen recovery but were then modified for $CO_2$ removal. Cellulose acetate membranes were initially developed for reverse osmosis but are now the most rugged $CO_2$ removal membrane available. The membranes used for $CO_2$ removal do not operate as filters, where small molecules are separated from larger ones through a medium with pores. Instead, they operate on the principle of solution-diffusion through a nonporous membrane. The $CO_2$ first dissolves into the membrane and then diffuses through it. Because the membrane does not have pores, it does not separate on the basis of molecular size. Rather, it separates based on how well different compounds dissolve into the membrane and then diffuse through it.

Because carbon dioxide, hydrogen, helium, hydrogen sulfide, and water vapor, for example, permeate quickly, they are called "fast" gases. Carbon monoxide, nitrogen, methane, ethane and other hydrocarbons permeate less quickly and so are called "slow" gases. The membranes allow selective removal of fast gases from slow gases. For example, as $CO_2$ is removed from a natural gas stream, water and $H_2S$ are removed at the same time; but methane, ethane, and higher hydrocarbons are removed at a much lower rate.

Both permeability and selectivity are important considerations when selecting a membrane. The higher the permeability, the less membrane area is required for a given separation and therefore the lower the system cost. The higher the selectivity, the lower the losses of hydrocarbons as $CO_2$ is removed and therefore the higher the volume of salable product. Unfortunately, high $CO_2$ permeability does not correspond to high selectivity, though achieving this combination is a constant goal for membrane scientists. Instead, they have to settle for a highly selective or permeable membrane or somewhere in-between on both parameters. The usual choice is to use a highly selective material then make it as thin as possible to increase the permeability. However, this reduced thickness makes the membrane extremely fragile and therefore unusable. For many years, membrane systems were not a viable process because the membrane thickness required to provide the necessary mechanical strength was so high that the permeability was minimal. An ingenious solution to this problem allowed membranes to break this limitation.

The solution was to produce a membrane consisting of an extremely thin nonporous layer mounted on a much thicker and highly porous layer of the same material. This membrane structure is referred to as asymmetric, as opposed to an homogenous structure, where membrane porosity is more-or-less uniform throughout. The nonporous layer meets the requirements of the ideal membrane, that is, it is highly selective and also thin. The porous layer provides mechanical support and allows the free flow of compounds that permeate through the nonporous layer. Although asymmetric membranes are a vast improvement on homogenous membranes, they do have one drawback. Because they are composed of only one material, they are costly to make out of exotic, highly customized polymers, which often can be produced only in small amounts. This difficulty is overcome by producing a composite membrane, which consists of a thin selective layer made of one polymer mounted on an asymmetric membrane, which is composed of another polymer. This composite structure allows membrane manufacturers to use readily available materials for the asymmetric portion of the membrane and specially developed polymers, which are highly optimized for the required separation, for the selective layer.

Gas separation membranes are manufactured in one of two forms: flat sheet or hollow fiber. The flat sheets are typically combined into a spiral-wound element, and the hollow fibers are combined into a bundle similar to a shell and tube heat exchanger. In the spiral-wound arrangement, two flat sheets of membrane with a permeate spacer in between are glued along three of their sides to form an envelope (or leaf, as it is called in the membrane industry) that is open at one end. Many of these envelopes are separated by feed spacers and wrapped around a permeate tube with their open ends facing the permeate tube. Feed gas enters along the side of the membrane and passes through the feed spacers separating the envelopes. As the gas travels between the envelopes, $CO_2$, $H_2S$, and other highly permeable compounds permeate into the envelope. These permeated components have only one outlet: they must travel within the envelope to the permeate tube. The driving force for transport is the low permeate and high-feed pressures. The permeate gas enters the permeate tube through holes drilled in the tube. From there, it travels down the tube to join the permeate from other tubes. Any gas on the feed side that does not get a chance to permeate leaves through the side of the element opposite the feed position. Possible optimizations for spiral-wound elements include the number of envelopes and element diameter. The permeate gas has to travel the length of each envelope, so having many shorter envelopes makes more sense than a few longer ones because pressure drop is greatly reduced in the former case. Larger-bundle diameters allow better packing densities but increase the element tube size and therefore cost. They also increase the element weight, which makes the elements more difficult to handle during installation and replacement. In hollow-fiber elements, very fine hollow fibers are wrapped around a central tube in a highly dense pattern. In this wrapping pattern, both open ends of the fiber end up at a permeate pot on one side of the element. Feed gas flows over and between the fibers, and some components permeate into them. The permeated gas then travels within the fibers until it reaches the permeate pot, where it mixes with the permeates from other fibers. The total permeate exits the element through a permeate pipe. Many optimizations are possible for hollow-fiber elements.

They include adjusting fiber diameters: finer fibers give higher packing density but larger fibers have lower permeate pressure drops and so use the pressure driving force more efficiently. Another optimization is the sleeve design, which forces the feed to flow countercurrent to the permeate instead of the more-usual and less-efficient cocurrent flow pattern. Each element type has its own advantages. Spiral-wound elements can handle higher pressure, are more resistant to fouling, and have a long history of service in natural gas sweetening. Hollow-fiber elements have a higher packing density, and so hollow fiber-based plants are typically smaller than spiral wound-based plants.

The advantage of the present invention is in low hydrocarbon loss and the ability to treat gases having a higher carbon dioxide level than are normally considered economically viable with prior art systems.

FIGS. 1 and 2 illustrate the function of the invention. In FIG. 1, a natural gas feed enters through a line 1. This natural gas feed has a high content of carbon dioxide and water. The natural gas feed proceeds through a line 2 to at least one adsorbent bed 4 in which water is removed from the natural gas feed. Most of the resulting dry natural gas feed proceeds in a line 6 to at least one adsorbent bed 8 in which carbon dioxide is removed. A portion of the dry natural gas is diverted in a line 56 to regenerate an adsorbent bed 68. The gas in the line 56 is boosted in pressure by a blower 58 and optionally heated by a heating unit 64 to a line 66 and then to the adsorbent bed 68. In the absence of added heat, the gas passes through a line 62 to the line 66 and the adsorbent bed 68. The adsorbent bed 68 is subjected to heated dry regeneration gas for a sufficient time to remove the adsorbed water and possible other contaminants. The resulting contaminated gas flow in a line 70 is sent through a cooler 72 and the flow in a line 74 passes to a separator 76 with water condensed and leaving the system at a line 78. The dried gas flow in a line 80 is returned to the natural gas feed entering the system at the line 1.

The adsorbent in the adsorbent bed 8 may be any adsorbent known to one skilled in the art that is employed for removal of carbon dioxide, such as sodium or calcium exchanged X type zeolites. During the adsorption phase of operation, this adsorbent bed removes sufficient carbon dioxide from the natural gas feed to reduce the carbon dioxide content below the desired 50 ppm level. Among the novel features of the present invention is the use of an essentially closed loop system combining adsorbent bed regeneration with a membrane system to both regenerate the adsorbent bed and remove carbon dioxide and other contaminants from this system and then returning the adsorbent bed to service following regeneration and cooling to operating temperature.

In FIG. 1, there are shown separate loops for the heating and the cooling portions of the regeneration of the adsorbent bed. There are pressure regulator valves 14 and 82 to send makeup gas into these loops as necessary to maintain the pressure levels. In the operation of the regeneration of the adsorbent bed, a portion of the gas flow in the line 6 can be diverted into a line 12 and then a line 16 as shown by operation of the pressure regulator valve 14. This gas flow is then heated by a heater 18 to a temperature sufficient to cause the adsorbed carbon dioxide to be removed from a regeneration adsorbent bed 22 in regeneration mode. The resulting gas flow in a line 24 that has a high concentration of carbon dioxide is shown passing through a cross-exchanger 26 in which the line 24 is lowered in temperature through heat exchange with a cooler flow of gas. The gas flow in a line 28 that exits the cross-exchanger 26 now passes through a cooling element 30 with the gas flow in a line 32 then passing through a compressor 34 to produce the compressed gas flow in a line 36 which then passes through a filter coalescer 38 to remove any liquids, and a guard bed 40. The gas flow in a line 42 then passes through a particle filter 44 with the gas flow in a line 46 then passing to a membrane unit 48. At the membrane unit 48, a portion of the gas flow that is concentrated with carbon dioxide passes through the membrane element within the membrane unit 48 as the permeate to be sent to flare or vent from the system at a line 50. The residue gas that has a lower concentration of carbon dioxide is the portion that does not flow through the membrane and instead is sent in a line 52 to pass through the cross-exchanger 26 to be heated by contact with the gas flow exiting the regeneration adsorbent bed 22. The warmed gas flow in a line 54 exiting the cross-exchanger 26 then is returned to the line 16 to circulate within the loop again.

After the heated regeneration cycle is complete, the adsorbent bed must be cooled back to operating temperatures for adsorption of carbon dioxide. FIG. 1 shows a cooling loop in which a portion of the purified gas flow in a line 10 is diverted at the line 80 by the pressure regulator valve 82 to pass through a line 84 to a cooling unit 86. The cooled gas in a line 88 is boosted in pressure by a blower 90 and the resulting gas flow in a line 92 is sent through an adsorbent bed 94 to cool the bed to operating temperatures. The gas flow in a line 96 that has passed through the adsorbent bed 94 is returned to the gas flow in the line 84 to remain within the cooling loop.

This system has been found to provide extremely effective results in providing low loss of valuable hydrocarbon while using the product gas as the regenerent and providing a very low carbon dioxide gas product. Variations on this system may be employed as are used by those skilled in the natural gas industry.

FIG. 2 shows an alternative embodiment of the invention in which the link between the cooling part of the regeneration cycle and the heating part of the regeneration cycle is shown. In addition, the regeneration of the water removal adsorbent beds is shown as part of the closed loop of regeneration gas as compared to FIG. 1 where the regeneration of the water removal adsorbent beds is a conventional open loop system. In FIG. 2, the natural gas feed in a line 100 that contains about 1.5% carbon dioxide (15,000 ppm) is shown entering the molecular sieve/membrane system of the present invention. In an example of the system in operation, this natural gas feed is at 12273 kPa (1780 psia) and 30° C. (86° F.). The natural gas feed 100 is shown being sent to line 102 to adsorbent beds 104, 106 for removal of carbon dioxide. Not shown in this drawing is the removal of water by at least one adsorbent bed. The purified natural gas feed exits the adsorbent beds 104, 106 at lines 108, 110 and then are combined in a line 112 to pass through a particle filter 114 and then exit the system to be cooled to become LNG. The purified natural gas has less than 50 ppm carbon dioxide. The other parts of the system are necessary to regenerate the adsorbent bed and to remove the carbon dioxide from the system with minimal loss of the methane in the natural gas.

As necessary, a portion of gas flow in the line 112 can be diverted to a chamber 122 to then be sent into the regeneration gas system. The gas stream in a line 124 is shown passing through a blower 126 to maintain pressure within the system at a desired level. The gas stream in a line 128 then passes through carbon guard beds 130, 132 to be further purified. The treated gas stream in a line 133 is then shown passing through an adsorbent bed 136 to cool it to the desired temperature for the adsorption part of the cycle. The gas flow in a line 137 is then cooled by cooler 138 and most of it is recirculated to the blower 126 for this cooling function. A portion of the cooled gas stream can be purged and sent to the regeneration gas stream as shown in a line 140. The adsorbent bed is regenerated by a gas stream that is boosted in pressure by a blower 142 and then is purified by carbon guard beds 144, 146. The gas stream in a line 148 is passed through a particle filter 150 and heated by a heating element 152. The resulting heated regeneration gas stream passes through an adsorbent bed 154 to remove the carbon dioxide from the adsorbent bed. This gas stream is then cooled by a cooler 156 and is shown as the gas stream in a line 157 passing through an adsorbent bed 158 for removal of water. The dried gas stream then is shown as a stream in a line 160, a portion of which is recirculated by the blower 142 within the regeneration cycle and a second portion is purged through a line 184. This second portion is concentrated with carbon dioxide, having about 6.8 wt-% $CO_2$. The line 184 then passes through a particle filter 186 through line 188 to a heater 190 and then a membrane unit 194 in which a stream 192 passes through a membrane element within the membrane unit to be vented or flared from the system at a line 196. The residue that does not pass through the membrane element is returned to the chamber 122. Also shown in FIG. 2 is a system to regenerate the adsorbent bed 158 that dries the regeneration stream. An adsorbent bed 164 is cooled by the gas stream at a line 166 passing through a cooler 168 with the cooled gas stream at a line 169 passing through a condenser 170 with water leaving the system at a line 171. The gas flow at a line 172 is then boosted in pressure by a blower 174 and then during the heating or regeneration part of the cycle, passes through a heater 178. During the cooling part of the cycle, the gas flow bypasses the heater at a line 180. The gas flow at a line 182 then is returned to the adsorbent bed 164.

What is claimed is:

1. A process of removing carbon dioxide from a natural gas feed stream comprising:
   a) sending said natural gas feed stream comprising methane and carbon dioxide through an adsorbent bed to produce a carbon dioxide depleted methane rich product stream, wherein said adsorbent adsorbs a majority of said carbon dioxide from said natural gas feed stream;
   b) regenerating said adsorbent bed by passing a regeneration gas stream through said adsorbent bed resulting in a regenerated adsorbent bed and a spent regeneration gas stream comprising carbon dioxide removed from said adsorbent bed;
   c) cooling said spent regeneration gas stream to a desired temperature to produce a cooled spent regeneration gas stream;
   d) sending said cooled spent regeneration gas stream to a membrane element to produce a permeate stream passing through said membrane element and a residue stream passing out of the membrane element without passing through said membrane element, wherein substantially all of said carbon dioxide and a minor portion of said methane from said cooled spent regeneration gas stream comprise said permeate stream and wherein a major portion of said methane and a minor portion of said carbon dioxide from said cooled spent regeneration gas stream comprise said residue stream;
   e) disposing said permeate stream; and
   f) recirculating said residue stream to join said regeneration gas stream.

2. The process of claim 1 wherein said regenerated adsorbent bed is cooled prior to passing said natural gas feed stream through said adsorbent bed.

3. The process of claim 1 wherein said cooled spent regeneration gas stream is sent through a phase separating element before passing to said membrane element, wherein liquids are removed from said cooled spent regeneration gas stream by said phase separating element.

4. The process of claim 3 wherein said phase separating element is a condenser.

5. The process of claim 1 wherein said residue gas is sent through a blower to boost its pressure prior to being returned to said regeneration gas stream.

6. The process of claim 1 wherein said carbon dioxide depleted methane rich product stream comprises less than 500 ppm carbon dioxide.

7. The process of claim 1 wherein said carbon dioxide depleted methane rich product stream comprises less than 100 ppm carbon dioxide.

8. The process of claim 1 wherein said carbon dioxide depleted methane rich product stream comprises less than 50 ppm carbon dioxide.

9. The process of claim 1 wherein said permeate stream comprises less than 25% by weight of said natural gas feed stream.

10. The process of claim 1 wherein said permeate stream comprises less than 10% by weight of said natural gas feed stream.

11. The process of claim 1 wherein said permeate stream comprises less than 5% by weight of said natural gas feed stream.

12. The process of claim 1 wherein said regeneration gas stream is heated prior to passing through said adsorbent bed.

13. The process of claim 12 wherein said residue stream joins said regeneration gas stream prior to heating said regeneration gas stream.

14. The process of claim 1 wherein a make-up gas stream is added to said regeneration gas stream to maintain said regeneration gas stream at a desired pressure.

15. The process of claim 14 wherein said make-up gas stream comprises a portion of said natural gas feed stream.

16. A natural gas purification system comprising:
   a) at least one adsorbent bed comprising an adsorbent that removes carbon dioxide from a natural gas feed stream to produce a purified natural gas product stream;
   b) a regeneration gas stream comprising a flow of heated gas to regenerate said adsorbent bed;
   c) a flow of cooled gas to cool said adsorbent bed;
   d) a membrane system to remove carbon dioxide from said regeneration gas stream; and
   e) a means to return a majority of said regeneration gas to said flow of heated gas after removal of said carbon dioxide from said regeneration gas stream.

17. The natural gas purification system of claim 16 wherein said natural gas purification system comprises at least three adsorbent beds.

18. The natural gas purification system of claim 16 further comprising means to add make-up gas to said regeneration gas stream from said natural gas feed stream or said purified natural gas product stream.

19. The natural gas purification system of claim 16 further comprising a phase separating element to remove liquids from said regeneration gas stream prior to passage of said regeneration gas stream to said membrane system.

* * * * *